United States Patent
Zhang et al.

(10) Patent No.: US 11,173,626 B2
(45) Date of Patent: Nov. 16, 2021

(54) STABLE WOOD PRESERVATIVE FORMULATIONS

(71) Applicant: Koppers Performance Chemicals Inc., Pittsburgh, PA (US)

(72) Inventors: Jun Zhang, Peachtree City, GA (US); Peter Tham, Morrow, GA (US)

(73) Assignee: KOPPERS PERFORMANCE CHEMICALS INC., Pittsburgh, PA (US)

( * ) Notice: Subject to any disclaimer, the term of this patent is extended or adjusted under 35 U.S.C. 154(b) by 32 days.

(21) Appl. No.: 16/322,060

(22) PCT Filed: Jul. 10, 2017

(86) PCT No.: PCT/US2017/041383
§ 371 (c)(1),
(2) Date: Jan. 30, 2019

(87) PCT Pub. No.: WO2018/026468
PCT Pub. Date: Feb. 8, 2018

(65) Prior Publication Data
US 2019/0184597 A1    Jun. 20, 2019

Related U.S. Application Data

(60) Provisional application No. 62/370,330, filed on Aug. 3, 2016.

(51) Int. Cl.

| | | |
|---|---|---|
| *B27K 3/52* | (2006.01) | |
| *B27K 3/50* | (2006.01) | |
| *A01N 25/30* | (2006.01) | |
| *A01N 55/02* | (2006.01) | |
| *A01N 25/04* | (2006.01) | |
| *A01N 43/653* | (2006.01) | |
| *B27K 3/22* | (2006.01) | |
| *B27K 3/34* | (2006.01) | |

(52) U.S. Cl.
CPC ............... *B27K 3/52* (2013.01); *A01N 25/04* (2013.01); *A01N 25/30* (2013.01); *A01N 43/653* (2013.01); *A01N 55/02* (2013.01); *B27K 3/22* (2013.01); *B27K 3/343* (2013.01); *B27K 3/50* (2013.01); *B27K 2240/20* (2013.01)

(58) Field of Classification Search
CPC . B27K 3/52; B27K 3/22; B27K 3/343; B27K 3/50; B27K 2240/20; A01N 25/30; A01N 55/02; A01N 25/04; A01N 43/653
See application file for complete search history.

(56) References Cited

U.S. PATENT DOCUMENTS

| | | | |
|---|---|---|---|
| 5,916,356 A | 6/1999 | Williams et al. | |
| 8,460,759 B2 * | 6/2013 | Leach | A01N 25/04 427/393 |
| 2003/0010956 A1 * | 1/2003 | Las | A01N 33/12 252/380 |
| 2007/0207076 A1 | 9/2007 | Guzzetta et al. | |
| 2014/0242404 A1 | 8/2014 | Hughes et al. | |
| 2015/0314471 A1 | 11/2015 | Thompson et al. | |

FOREIGN PATENT DOCUMENTS

| | | | | |
|---|---|---|---|---|
| EP | 0058142 A2 * | 8/1982 | ............... | B27K 3/22 |
| JP | H 05-194117 | 8/1993 | | |
| JP | H 05-301802 | 11/1993 | | |
| JP | H 07-50092 | 2/1995 | | |
| JP | H 08-039514 | 2/1996 | | |
| JP | 2003-160402 | 6/2003 | | |
| JP | 2003-252705 | 9/2003 | | |
| JP | 4180272 B2 * | 11/2008 | | |
| WO | WO-2007053252 A1 * | 5/2007 | ............... | C01G 3/00 |

OTHER PUBLICATIONS

International Search Report dated Sep. 5, 2017, issued in PCT/US2017/041383.
Written Opinion of the International Searching Authority dated Sep. 5, 2017, issued in PCT/US17/041383.

* cited by examiner

*Primary Examiner* — Snigdha Maewall
(74) *Attorney, Agent, or Firm* — K&L Gates LLP

(57) ABSTRACT

Stable wood preservative formulations comprising an amine copper complex, an azole compound, a cationic surfactant, and optionally, an organic solvent, are disclosed. The wood preservative formulations exhibit long-term stability and remain homogeneous, without the need for agitation.

24 Claims, No Drawings

STABLE WOOD PRESERVATIVE FORMULATIONS

FIELD OF THE INVENTION

The field of the invention relates to stable wood preservative formulations.

BACKGROUND OF THE INVENTION

Wood preservative formulations comprising water soluble amine-copper solutions alone cannot be used as wood preservative formulations because the presence of copper-tolerant fungi in wood prevents such formulations from being effective. As a result, a co-biocide, such as an azole compound, may be added to amine-copper formulations to control copper-tolerant decay fungi.

However, azoles are not water-soluble and are not readily mixed into amine-copper solutions. As a result, one or more surfactants or emulsifiers, along with one or more organic solvents, may be used to facilitate the mixing of azole in the amine-copper solution. Many surfactants or emulsifiers will keep the azole in the amine-copper solution temporarily, however, the azole will phase separate over time during storage. As a result, often times amine-copper/azole formulations require periodic agitation. Additionally, amine-copper/azole formulations may become unstable during wood vacuum pressure treatment processes because the kickbacks from the treated wood, such as wood extractives and wood sugars, and contaminants from the surface of wood, can also cause azole instability and phase separation. Moreover, when multiple preservatives are used in the same treating plant, cross-contamination between different treating solutions is often unavoidable. Cross-contamination with other preservative systems, especially quaternary ammonium-based formulations, can also result in azole phase separation.

Thus, there exists a need for stable wood preservative formulations comprising copper-amine compositions in addition to one or more azoles. The inventors have surprisingly discovered that use of certain specific cationic surfactants in the wood preservative formulations of the invention results in formulations having long-term stability, superior to wood preservation formulations that are currently available. Another surprising discovery is that the use of the specific cationic surfactants disclosed herein can also maintain the stability of mold inhibitor chemicals in the preservative treating solutions.

SUMMARY OF THE INVENTION

The invention is directed to stable wood preservative formulations, methods of using the formulations and wood or wood products that have been treated with the formulations.

In certain embodiments, the invention is directed to stable wood preservative formulations comprising: (a) an amine-copper complex; (b) an azole compound; (c) a cationic surfactant having the following structure:

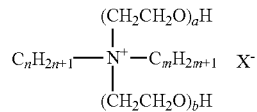

wherein the value of m is at least 1 and at most 20, the value of n is at least 1 and at most 20, the value of a is at least 1 and at most 5, the value of b is at least 1 and at most 5; and wherein said azole remains stable in solution and does not phase separate over the course of about 30 days to about 360 days while the formulation is stored at a temperature of about 0° C. to about 50° C.

In certain embodiments, $X^-$ is an anion selected from the group consisting of borate, chloride, carbonate, bicarbonate, bromide, iodides, formate, acetate, propionate, and other alkyl carboxylates. In certain embodiments, the value of m is 1, and n is 10 or 12, and the value of a is 1, and the value of b is 1.

In certain embodiments, the amine-copper complex comprises an amine selected from the group consisting of an alkanolamine, monoethanolamine, ethanolamine, diethanolamine, triethanolamine and ammonia.

In certain embodiments, the amine-copper complex is prepared from a copper compound selected from the group consisting of copper metal, cuprous oxide, cupric oxide, copper hydroxide, copper carbonate, basic copper carbonate, copper oxychloride, copper 8-hydroxyquinolate, copper dimethyldithiocarbamate, copper omadine, and copper borate.

In certain embodiments, the azole is selected from the group consisting of epoxiconazole, triadimenol, propiconazole, prothioconazole, metconazole, cyproconazole, tebuconazole, flusilazole, penflufen, paclobutrazol, fluconazole, isavuconazole, itraconazole, voriconazole, pramiconazole, ravuconazole, and posaconazole.

In certain embodiments, the azole remains stable in solution and does not phase separate over the course of about 30 days to about 365 days, or about 30 days to about 120 days, or about 30 days to about 90 days, or about 30 days to about 60 days, or about 15 days to about 365 days, or about 15 days to about 36 days, or about 45 days.

In certain embodiments, the stable wood preservative formulations of the invention comprise an organic solvent. In certain embodiments, the organic solvent is selected from the group consisting of glycols, esters, alcohols, and amide solvents.

In certain embodiments, the glycol solvent is selected from the group consisting of diethylene glycol, dipropylene glycol, ethylene glycol, glycerine, glycerol, hexylene glycol, neopentylglycol, polyethylene glycol, polypropylene glycol, tetraethylene glycol, triethylene glycol, and tripropylene glycol.

In certain embodiments, the ester solvent is selected from the group consisting of amyl acetate, dibasic ester, ethyl acetate, 2-ethyl hexyl acetate, ethyl propionate, acetate esters, isobutyl acetate, isobutyl isobuterate, isopropyl acetate, n-butyl acetate, n-butyl propionate, n-pentyl propionate, and n-propyl acetate.

In certain embodiments, the alcohol solvent is selected from the group consisting of amyl alcohol, benzyl alcohol, cyclohexanol, ethyl alcohol-denatured, 2-ethyl hexanol, isooctyl alcohol, isodecyl alcohol, tridecyl alcohol, furfuryl alcohol, isobutyl alcohol, methanol, methyl amyl alcohol, methyl isobutyl carbinol (MIBC), n-butyl alcohol, n-propyl alcohol, secondary butyl alcohol, tertiary butyl alcohol, and tetrahydrofurfuryl alcohol.

In certain embodiments, the amide solvent is selected from the group consisting of N-methyl-2-pyrrolidone, N-methylformamide, dimethylacetamide, dimethylformamide, N-vinylacetamide, N-vinylpyrrolidone, 1-octyl-2-pyrrolidone, N,N-dimethyl 9-decenamide, dimethyl lauramide, N,N-dimethyl-dodecanamide, N,N-dimethylmyristamide, and N,N-dimethyldecanamide.

In certain embodiments, the weight ratio of the cationic surfactant to the azole is from about 1:1 to about 100:1, or about 5:1 to about 50:1, or about 5:1 to about 15:1.

In certain embodiments, the total weight ratio of the one or more organic solvents to the total azole is from about 1:1 to about 50:1, or about 2:1 to about 10:1, or about 2:1 to about 5:1.

In certain embodiments, the stable wood preservative formulation is diluted with water to make a preservative treating solution prior to contacting wood or a wood product.

In certain embodiments, the water-diluted wood preservative treating solutions of the invention comprise an isothiazole-based mold inhibitor. In certain embodiments, the isothiazole-based mold inhibitor is selected from the group consisting of methylisothiazolinone (MIT), chloromethylisothiazolinone (CMIT), octylisothiazolinone (OIT), dichlorooctylisothiazolinone (DCOIT), benzisothiazolinone (BIT), methylbenzisothiazolinone (MBIT), and butylbenzisothiazolinone (BBIT).

In certain embodiments, the stable wood preservative formulations disclosed herein are stable when stored at a temperature from about 0° C. to about 50° C., or about 5° C. to about 45° C., or about 10° C. to about 40° C., or about 15° C. to about 35° C., or about 20° C. to about 30° C.

The invention is also directed to methods of treating wood or a wood product comprising contacting the stable wood preservative formulations disclosed herein with wood or a wood product. The invention is also directed to wood or a wood product treated with the stable wood preservative formulation disclosed herein.

DETAILED DESCRIPTION OF THE INVENTION

Provided is a wood preservative composition for treating wood-based products against biological deterioration. The preservative composition comprises an amine copper complex, an azole compound, and a cationic surfactant, and optionally one or more organic solvents. It has surprisingly been found that the specific cationic surfactants disclosed herein stabilize the formulations of the invention in ways that other surfactants do not. In particular, the specific cationic surfactants disclosed herein keep the azole component stable in the amine copper solution during storage, during high shear agitation, during the pressure treatment process, and during cross-contamination with other preservative components.

In one embodiment, the wood preservative compositions of the invention are stable during static storage without agitation. In another embodiment, the wood preservative compositions are stable after vacuum/pressure treatment. In another embodiment, the wood preservative compositions are stable when cross-contaminated with other preservative solutions containing quaternary ammonium compounds. In another embodiment, the wood preservative compositions are concentrates that may be diluted prior to treating wood or wood-based products. In another embodiment, the wood preservative compositions are treating solutions that are ready to use for treating wood or wood-based products.

The wood preservative compositions of the invention comprise the following components:

An amine-copper complex: The amine-copper complex disclosed in the current invention is a soluble copper solution in which copper or copper compound(s) are dissolved using aqueous amine ligands (or complexing agents). Examples of amine ligands include, but are not limited to, alkanolamines, such as, for example, monoethanolamine, ethanolamine, diethanolamine, triethanolamine and ammonia. The copper or copper compounds include, but are not limited to, copper metal, cuprous oxide (a source of copper (I) ions), cupric oxide (a source of copper (II) ions), copper hydroxide, copper carbonate, basic copper carbonate, copper oxychloride, copper 8-hydroxyquinolate, copper dimethyldithiocarbamate, copper omadine, copper borate, copper residues (copper metal byproducts) or any suitable copper source.

The molar ratio of amine ligand to copper is about 3:1, or about 4:1, or about 5:1, or about 6:1.

An azole compound: Examples of azole compounds include, but are not limited to, epoxiconazole, triadimenol, propiconazole, prothioconazole, metconazole, cyproconazole, tebuconazole, flusilazole, penflufen, paclobutrazol, fluconazole, isavuconazole, itraconazole, voriconazole, pramiconazole, ravuconazole, posaconazole, benzovindiflupyr, and penflufen.

A cationic surfactant having the following structure:

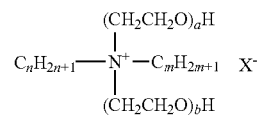

wherein the value of m is at least 1 and at most 20, the value of n is at least 1 and at most 20, the value of a is at least 1 and at most 5, the value of b is at least 1 and at most 5, and $X^-$ is an anion selected from the group consisting of borate, chloride, carbonate, bicarbonate, bromide, iodides, formate, acetate, propionate, and other alkyl carboxylates. In certain embodiments, the value of m is 1, and n is 10 or 12, the value of a is 1, the value of b is 1, and $X^-$ is borate, chloride, propionate, carbonate, or bicarbonate.

An organic solvent: Generally, the azole compound can be dissolved directly in the cationic surfactant. However, for ease of formulation, the azole compounds can be solubilized first in an organic solvent or a combination of organic solvents. The organic solvent can be selected from: glycols, esters, alcohols, or amide solvents.

Non-limiting examples of glycol solvents include diethylene glycol, dipropylene glycol, ethylene glycol, glycerine, glycerol, hexylene glycol, neopentylglycol, polyethylene glycol, polypropylene glycol, tetraethylene glycol, triethylene glycol, tripropylene glycol.

Non-limiting examples of ester solvents include amyl acetate, dibasic ester, ethyl acetate, 2-ethyl hexyl acetate, ethyl propionate, acetate esters, isobutyl acetate, isobutyl isobuterate, isopropyl acetate, n-butyl acetate, n-butyl propionate, n-pentyl propionate, n-propyl acetate. Non-limiting examples of alcohol solvents include amyl alcohol, benzyl alcohol, cyclohexanol, ethyl alcohol-denatured, 2-ethyl hexanol, isooctyl alcohol, isodecyl alcohol, tridecyl alcohol, furfuryl alcohol, isobutyl alcohol, methanol, methyl amyl alcohol, methyl isobutyl carbinol (MIBC), n-butyl alcohol, n-propyl alcohol, secondary butyl alcohol, tertiary butyl alcohol, tetrahydrofurfuryl alcohol.

Non-limiting examples of amide solvents include N-methyl-2-pyrrolidone, N-methylformamide, dimethylacetamide, dimethylformamide, N-vinylacetamide, N-vinylpyrrolidone, 1-octyl-2-pyrrolidone, N,N-dimethyl 9-decenamide, dimethyl lauramide, N,N-dimethyldodecanamide, N,N-dimethylmyristamide, N,N-dimethyldecanamide.

Isothiazole-based mold inhibitors: methylisothiazolinone (MIT), chloromethylisothiazolinone (CMIT), octylisothiazolinone (OIT), dichlorooctylisothiazolinone (DCOIT), benzisothiazolinone (BIT), methylbenzisothiazolinone (MBIT), butylbenzisothiazolinone (BBIT).

Weight ratios: The weight ratio of the cationic surfactant to the total amount of azole can vary from about 1:1 to about 100:1, preferably about 5:1 to about 50:1, and most preferably from about 5:1 to about 15:1. The total weight ratio of the one or more organic solvents to the total amount of azole can vary from about 1:1 to about 50:1, or about 2:1 to about 10:1, or about 2:1 to about 5:1.

Stable Formulations: It has been surprisingly discovered that a cationic surfactant having the structure disclosed above can be used to formulate the stable amine-copper/azole compositions of the invention.

As used herein, the phrase "long-term" means from about 15 to about 365 days, or longer, when the formulations are kept at a temperature of about 0° C. to about 50° C. An unstable formulation will undergo azole phase separation resulting in the azole floating or precipitating out of the amine-copper solution, or a non-homogenous azole level distributed in different zones of the formulation container.

As used herein, the term "stable" means that the formulations of the invention remain uniform or homogenous over time such that the azole remains in solution and does not precipitate out of solution or phase separate. One preferred means for confirming that a formulation of the invention is stable, as that term is used herein, is to remove samples of the formulation from the top, middle and bottom of the container in which the formulation is stored, without agitation or circulation, and then chemically analyzing the azole level in the three samples. If the azole level determined by the analysis of the three samples is equivalent, then the formulation is considered to be stable. It is worth noting that the azole may chemically degrade over time so that the overall azole level by analysis may be lower than the initial azole level, or the one or more organic solvents or water may evaporate over time so that the overall azole level by analysis may be higher than the initial azole level. However, as long as the azole analysis shows comparable azole levels in different zones of the container, then the formulation is considered to be stable. The formulations of the invention also demonstrate azole stability in amine-copper solutions when the formulations are further diluted with water.

Advantages of the stable formulations of the invention: The stable wood preservative formulations of the invention have the following advantages over currently-available formulations comprising different surfactants:

1. Superior long-term storage stability without agitation compared to other formulations using different surfactants.

2. Stability during the pressure impregnation process, even when wood extractives/sugars or other contaminants from the wood surface are introduced to the treating solution.

3. Compatibility with other preservative systems, such as quaternary ammonium compound-based formulations.

4. In addition to the above-mentioned advantages, it is also surprising that the use of the surfactant disclosed in the current invention can also help maintain the stability of isothiazole-based mold inhibitors that are required to be used in the treating solution to prevent mold growth on the pressure treated wood The wood preservative compositions disclosed herein can be used for protecting wood against wood decay attack and termite attack. Treating methods include vacuum pressure, dipping, brush and spray treating.

The Examples listed below illustrate the compositions and preparation of the formulations according to the invention. The compositions described in these Examples are illustrative only, and are not intended to limit the invention in any manner and should not be construed to limit the scope of the claims herein. Reference Example 1 shows compositions that use other surfactants not according to the current invention, and none of the compositions in Example 1 are stable in terms of azole phase separation. Examples 2-4 disclose compositions that use the surfactant according to the present invention and demonstrate superior stability during storage, during the wood pressure treating process, in contact with quaternary ammonium compound, and stability of mold inhibitors.

Example 1: The following azole intermediate concentrates have been formulated with various surfactants as described in Table 1 (percentages are weight percent):

Azole Intermediate Concentrate Group #1: Ratio of total surfactant to total azole is about 10 to 1:
N-methyl-2-pyrrolidone: 16.04%
Di-propylene glycol: 3.94%
Tebuconazole, technical grade: 3.57%
Propiconazole, technical grade: 3.68%
Surfactant(s): 72.77%

Azole Intermediate Concentrate Group #2: Ratio of total surfactant to total azole is about 14.4 to 1:
N-methyl-2-pyrrolidone: 16.04%
Di-propylene glycol: 3.94%
Tebuconazole, technical grade: 2.55%
Propiconazole, technical grade: 2.63%
Surfactant(s): 74.84%

For each group of azole intermediate concentrate formulations, the surfactant is selected from Table 1.

TABLE 1

| The Surfactants Used in the above Azole Intermediate Concentrates |  |
|---|---|
| a. | Ethoxylated coco amines with about 2 moles of ethylene oxide (EO) |
| b. | Ethoxylated coco amines with about 7.5 moles of EO |
| c. | Ethoxylated tallow amines with about 5 moles of EO |
| d. | Ethoxylated tallow amines with about 8 moles of EO |
| e. | Ethoxylated tallow amines with about 15 moles of EO |
| f | Polyoxyethylene (5) cocoalkylamines |
| g. | Polyoxyethylene (15) cocoalkylamines |
| h. | Polyoxyethylene tallowalkylamines |
| i. | C8/C18 Coconut fatty amine ethoxylate with 15 EO |
| j. | C8/C18 Coconut fatty amine ethoxylate with 20 EO |
| k. | Cetyl/oleyl amine ethoxylate with 20 EO |
| l. | Cetyl/stearyl amine ethoxylate with 15 EO |
| m. | Cetyl/stearyl amine ethoxylate with 20 EO |
| n. | Cetyl/stearyl amine ethoxylate with 25 EO |
| o. | Tallow fatty alkyl amine ethoxylate with 15 EO |
| p. | Bbis-(2-hydroxyethyl) isodecyloxypropylamine |
| q. | Poly (5) oxyethylene isodecyloxypropylamine |
| r. | Bis-(2-hydroxyethyl) isotridecyloxypropylamine |
| s. | Poly (5) oxyethylene isotridecyloxypropylamine |

The azole intermediate concentrates formulated in Group #1 were then mixed with copper-monoethanolamine solution to make the final formulations as follows:
Copper monoethanolamine complex: 27.03%
Azole Intermediate Concentrate in Group #1: 5.43%
Water: 67.54%

The final formulations contain target concentration of 9.25% Cu+0.19% Tebuconazole+0.19% propiconazole. Phase separation was observed immediately with several of the formulations (Table 2). For those formulations which did not show quick phase separation, aliquot samples were taken from top and bottom of container for azole analysis and the results are given in Table 2. The results showed the substantially different levels of azole from the top and the bottom of the container, indicating the phase separation of azoles from amine-copper solutions.

TABLE 2

Azole Analysis in Various Amine Copper Azole Formulations

| Surfactants used in Formulation | Tebuconazole Analysis, % | | Propiconazole Analysis, % | |
|---|---|---|---|---|
| | Top | Bottom | Top | Bottom |
| Ethoxylated coco amines with about 2 moles EO | 0.13 | 0.26 | 0.13 | 0.25 |
| Ethoxylated coco amines with about 7.5 moles of EO | 0.10 | 0.32 | 0.09 | 0.31 |
| Ethoxylated tallow amines with about 5 moles of EO | 0.04 | 0.57 | 0.03 | 0.54 |
| Ethoxylated tallow amines with about 8 moles of EO | 0.04 | 0.34 | 0.03 | 0.32 |
| Ethoxylated tallow amines with about 15 moles of EO | 0.16 | 0.27 | 0.15 | 0.26 |
| Polyoxyethylene (5) cocoalkylamines | Phase separation visually observed, no analysis was conducted | | | |
| Polyoxyethylene (15) cocoalkylamines | | | | |
| Polyoxyethylene tallowalkylamines | | | | |
| C8/C18 Coconut fatty amine ethoxylate with 15 EO | | | | |
| C8/C18 Coconut fatty amine ethoxylate with 20 EO | | | | |
| Cetyl/oleyl amine ethoxylate with 20 EO | | | | |
| Cetyl/stearyl amine ethoxylate with 15 EO | | | | |
| Cetyl/stearyl amine ethoxylate with 20 EO | | | | |
| Cetyl/stearyl amine ethoxylate with 25 EO | | | | |
| Tallow fatty alkyl amine ethoxylate with 15 EO | | | | |
| Bbis-(2-hydroxyethyl) isodecyloxypropylamine | | | | |
| Poly (5) oxyethylene isodecyloxypropylamine | | | | |
| Bis-(2-hydroxyethyl) isotridecyloxypropylamine | | | | |
| Poly (5) oxyethylene isotridecyloxypropylamine | | | | |

Example 2: A cationic surfactant, coco alkylbis(hydroxyethyl)methylammonium compound according to the current invention, is used in the formulation, and a stable amine copper azole formulation is achieved. The formulation process includes dissolving the azole in the quaternary ammonium compound with or without the aid of one or more organic solvents, and then mixing with soluble amine copper concentrate to make the final formulation, as described below (percentages are weight percent):

Step 1: Azole intermediate concentrate:
N Methy Pyrrolidone: 8.02%
Diproplyene Glycol: 1.97%
Tebuconazole: 3.50%
Propiconazole: 3.50%
Cocobis(2-hydroxyethyl)methylammonium chloride: 59.77%
Water or 2-propanol: 23.24%

Step 2: Mix the azole intermediate concentrate with an amine copper concentrate to achieve a final amine copper azole preservative composition:
Copper monoethanolamine complex: 27.03%
Azole intermediate concentrate containing 7.0% Azoles: 5.43%
Water: 67.54%

The final amine copper azole concentrate contains a target of concentration of 9.63% total actives (9.25% Cu+0.19% tebuconazole and 0.19% propiconazole). The samples were stored at ambient temperature and 40° C., and aliquot samples were taken for azole analysis and the results are given in Table 3. The analytical results in Table 3 indicated that this concentrate is stable during storage.

TABLE 3

The Azole Stability in the Amine-Copper-Azole Concentrate

| Storage Time | Tebuconazole Analysis, % | | | Propiconazole Analysis, % | | |
|---|---|---|---|---|---|---|
| | Top | Bottom | Middle | Top | Bottom | Middle |
| Initial (Freshly prepared) | 0.18 | 0.18 | 0.18 | 0.17 | 0.17 | 0.17 |
| 1 Week @ Ambient Temperature | 0.17 | 0.17 | 0.17 | 0.16 | 0.16 | 0.16 |
| 1 Month @ Ambient Temperature | 0.16 | 0.17 | 0.17 | 0.16 | 0.16 | 0.16 |
| 6 Months @ Ambient Temperature | 0.19 | 0.19 | 0.19 | 0.18 | 0.18 | 0.18 |
| 1 Week @ 40° C. | 0.17 | 0.17 | 0.17 | 0.16 | 0.16 | 0.16 |
| 1 Month @ 40° C. | 0.17 | 0.16 | 0.17 | 0.15 | 0.15 | 0.15 |
| 6 Months @ 40° C. | 0.20 | 0.20 | 0.20 | 0.15 | 0.15 | 0.15 |

The 9.63% concentrate can be further diluted to make treating solutions at various concentrations, such as about 0.20%, or about 0.60%, or about 0.90%, or about 1.50% total actives. The treating solution is stable at all these solution strengths for months.

Example 3: The concentrate as formulated in Example 2 was further diluted with water to make solutions containing about 0.9% Cu and 1.5% Cu. In addition, 0.1% of a dimethyldidecylammonium chloride (DDAC) was added to the solution. Aliquot solutions were taken from the top, bottom and middle of the storage container, and the azole was analyzed as shown in Table 4. The results presented in Table 4 show that the addition of DDAC did not affect the stability of the azoles in the solutions.

TABLE 4

The Azole Stability in the Amine-Copper-Azole Solution Containing Quat

| | Tebuconazole Analysis, ppm | | | Propiconazole Analysis, ppm | | |
|---|---|---|---|---|---|---|
| Storage Time | Top | Bottom | Middle | Top | Bottom | Middle |
| 0.9% Cu Solution + 0.1% DDAC-Initial | 165 | 166 | 166 | 159 | 154 | 153 |
| 0.9% Cu Solution + 0.1% DDAC-1 Month | 164 | 165 | 166 | 151 | 153 | 157 |
| 1.5% Cu Solution + 0.1% DDAC-Initial | 274 | 275 | 272 | 265 | 259 | 256 |
| 1.5% Cu Solution + 0.1% DDAC-1 Month | 267 | 273 | 271 | 265 | 260 | 260 |

Example 4: The concentrate as formulated in Example 2 was diluted with water to make various treating solutions. These solutions were mixed under high-shear, and then used to pressure treat wood in a bench-top treating cylinder, the azoles in solutions before and after each treatment were analyzed and the results provided in Table 5 show that the amine-copper-azole solutions were still stable in the solutions after high-shear mixing and after treatment.

TABLE 5

The Azole Stability in the Amine-Copper-Azole Treating Solution Before and After Wood Treatment

| | Tebuconazole Analysis, ppm | | | Propiconazole Analysis, ppm | | |
|---|---|---|---|---|---|---|
| Storage Time | Top | Bottom | Middle | Top | Bottom | Middle |
| 0.2% Cu Solution-Before Treating | 34 | 32 | 31 | 25 | 25 | 25 |
| 0.2% Cu Solution-After Treating | 38 | 42 | 39 | 32 | 32 | 32 |
| 0.6% Cu Solution-Before Treating | 114 | 114 | 130 | 102 | 102 | 103 |
| 0.6% Cu Solution-After Treating | 120 | 124 | 122 | 110 | 111 | 110 |
| 0.9% Cu Solution-Before Treating | 180 | 183 | 180 | 169 | 170 | 168 |
| 0.9% Cu Solution-After Treating | 184 | 183 | 182 | 171 | 172 | 170 |
| 1.5% Cu Solution-Before Treating | 306 | 307 | 305 | 288 | 291 | 288 |
| 1.5% Cu Solution-After Treating | 297 | 303 | 295 | 284 | 288 | 282 |

What is claimed is:

1. A stable wood preservative formulation comprising:
   a. an amine-copper complex;
   b. at least one azole compound selected from the group consisting of tebuconazole and propiconazole;
   c. a cationic surfactant having the following structure:

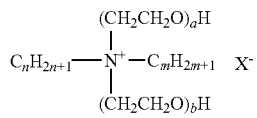

wherein the value of m is at least 1 and at most 20, the value of n is at least 1 and at most 20, the value of a is at least 1 and at most 5, the value of b is at least 1 and at most 5; and an isothiazole-based mold inhibitor;

wherein the weight ratio of the cationic surfactant to the at least one azole compound is from about 1:1 to about 15:1; and wherein said azole remains stable in solution and does not phase separate over the course of about 15 days to about 365 days while the formulation is stored at a temperature of about 0° C. to about 50° C.

2. The stable wood preservative formulation of claim 1, wherein said amine-copper complex comprises an amine selected from the group consisting of an alkanolamine, monoethanolamine, ethanolamine, diethanolamine, triethanolamine and ammonia.

3. The stable wood preservative formulation of claim 1, wherein said amine-copper complex is prepared from a copper compound selected from the group consisting of copper metal, cuprous oxide, cupric oxide, copper hydroxide, copper carbonate, basic copper carbonate, copper oxychloride, copper 8-hydroxyquinolate, copper dimethyldithiocarbamate, copper omadine, and copper borate.

4. The stable wood preservative formulation of claim 1, wherein $X^-$ is an anion selected from the group consisting of borate, chloride, carbonate, bicarbonate, bromide, iodides, formate, acetate, propionate, and other alkyl carboxylates.

5. The stable wood preservative formulation of claim 4, wherein $X^-$ is borate, chloride, propionate, carbonate, or bicarbonate.

6. The stable wood preservative formulation of claim 1, wherein the value of m is 1 and n is 10 or 12, and the value of a is 1, and the value of b is 1.

7. The stable wood preservative formulation of claim 1, wherein said azole remains stable in solution and does not phase separate over the course of about 15 to about 360 days.

8. The stable wood preservative formulation of claim 1, wherein said azole remains stable in solution and does not phase separate over the course of about 30 to about 90 days.

9. The stable wood preservative formulation of claim 1, wherein said azole remains stable in solution and does not phase separate over the course of about 30 to about 60 days.

10. The stable wood preservative formulation of claim 1, wherein said azole remains stable in solution and does not phase separate over the course of about 45 days.

11. The stable wood preservative formulation of claim 1, wherein said formulation further comprises one or more organic solvents.

12. The stable wood preservative formulation of claim 11, wherein said organic solvent is selected from the group consisting of glycols, esters, alcohols, and amide solvents.

13. The stable wood preservative formulation of claim 12, wherein said glycol solvent is selected from the group consisting of diethylene glycol, dipropylene glycol, ethylene glycol, glycerine, glycerol, hexylene glycol, neopentylglycol, polyethylene glycol, polypropylene glycol, tetraethylene glycol, triethylene glycol, and tripropylene glycol.

14. The stable wood preservative formulation of claim 12, wherein said ester solvent is selected from the group consisting of amyl acetate, dibasic ester, ethyl acetate, 2-ethyl hexyl acetate, ethyl propionate, acetate esters, isobutyl acetate, isobutyl isobuterate, isopropyl acetate, n-butyl acetate, n-butyl propionate, n-pentyl propionate, and n-propyl acetate.

15. The stable wood preservative formulation of claim 12, wherein said alcohol solvent is selected from the group consisting of amyl alcohol, benzyl alcohol, cyclohexanol, ethyl alcohol-denatured, 2-ethyl hexanol, isooctyl alcohol, isodecyl alcohol, tridecyl alcohol, furfuryl alcohol, isobutyl alcohol, methanol, methyl amyl alcohol, methyl isobutyl carbinol (MIBC), n-butyl alcohol, n-propyl alcohol, secondary butyl alcohol, tertiary butyl alcohol, and tetrahydrofurfuryl alcohol.

16. The stable wood preservative formulation of claim 12, wherein said amide solvent is selected from the group consisting of N-methyl-2-pyrrolidone, N-methylformamide, dimethylacetamide, dimethylformamide, N-vinylacetamide, N-vinylpyrrolidone, 1-octyl-2-pyrrolidone, N,N-dimethyl 9-decenamide, dimethyl lauramide, N,N-dimethyl-dodecanamide, N,N-dimethylmyristamide, and N,N-dimethyldecanamide.

17. The stable wood preservative formulation of claim 11, wherein the total weight ratio of the one or more organic solvents to the total azole is from about 1:1 to about 50:1.

18. The stable wood preservative formulation of claim 11, wherein the total weight ratio of the one or more organic solvents to the total azole is from about 2:1 to about 10:1.

19. The stable wood preservative formulation of claim 11, wherein the total weight ratio of the one or more organic solvents to the total azole is from about 2:1 to about 5:1.

20. The stable wood preservative formulation of claim 1, wherein said formulation is diluted with water prior to contacting wood or a wood product.

21. The stable wood preservative formulation of claim 1, wherein said isothiazole-based mold inhibitor is selected from the group consisting of methylisothiazolinone (MIT), chloromethylisothiazolinone (CMIT), octylisothiazolinone (OIT), dichlorooctylisothiazolinone (DCOIT), benzisothiazolinone (BIT), methylbenzisothiazolinone (MBIT), and butylbenzisothiazolinone (BBIT).

22. The stable wood preservative formulation of claim 1, wherein said temperature is from about 5° C. to about 45° C., or about 10° C. to about 40° C., or about 15° C. to about 35° C., or about 20° C. to about 30° C.

23. A method of treating wood or a wood product comprising contacting the stable wood preservative formulation of claim 1 with wood or a wood product.

24. Wood or a wood product treated with the stable wood preservative formulation of claim 1.

* * * * *